(12) United States Patent
Luft et al.

(10) Patent No.: US 6,509,112 B1
(45) Date of Patent: Jan. 21, 2003

(54) DIRECT METHANOL FUEL CELL (DMFC)

(75) Inventors: Günter Luft, Lauf (DE); Kurt Pantel, Heroldsberg (DE); Manfred Waidhas, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/214,107
(22) PCT Filed: Jun. 25, 1997
(86) PCT No.: PCT/DE97/01320

§ 371 (c)(1),
(2), (4) Date: Dec. 28, 1998

(87) PCT Pub. No.: WO97/50140

PCT Pub. Date: Dec. 31, 1997

(30) Foreign Application Priority Data

Jun. 26, 1996 (DE) .......................... 196 25 621

(51) Int. Cl.⁷ .......................... H01M 8/04; H01M 8/06
(52) U.S. Cl. .......................... 429/13; 429/23; 429/26; 429/17; 429/19
(58) Field of Search .......................... 429/13, 17, 19, 429/22, 23, 26, 30, 12

(56) References Cited

U.S. PATENT DOCUMENTS

| | | | | |
|---|---|---|---|---|
| 4,629,664 A | * | 12/1986 | Tsukui et al. | 429/23 |
| 5,059,494 A | * | 10/1991 | Vartanian et al. | 429/17 |
| 5,523,177 A | | 6/1996 | Kosek et al. | 429/40 |
| 5,547,776 A | * | 8/1996 | Fletcher et al. | 429/13 |
| 5,616,430 A | * | 4/1997 | Aoyama | 429/17 |

FOREIGN PATENT DOCUMENTS

| | | |
|---|---|---|
| DE | 33 45 956 A1 | 6/1984 |
| EP | 0 072 038 A2 | 2/1983 |
| EP | 0 693 793 A2 | 1/1996 |
| JP | 4-229958 * | 8/1992 |

OTHER PUBLICATIONS

Patent Abstracts of Japan Publication No. 63–237363, Mar. 10, 1988.
Patent Abstracts of Japan Publication No. 2–234359, Sep. 17, 1990.
Patent Abstracts of Japan Publication No. 2–234358, Sep. 17, 1990.
Article entitled "Analysis of the Electrochemical Characteristics of a Direct Methanol Fuel Cell Based on a Pt–Ru/C Anode Catalyst", Arico et al., *J. Electrochem. Soc.*, vol. 143, No. 12, Dec. 1996, pp. 3950–3959.
Article entitled "Performance and modelling of a direct methanol solid polymer electrolyte fuel cell", Scott et al., *Journal of Power Sources*, vol. 65, (Mar. 1997), pp. 159–171.
Article entitled "High Performance Direct Methanol Polymer Electrolyte Fuel Cells", Ren et al., *Journal of the Electrochemical Society*, vol. 143, (Jan. 1996).
Article entitled "Dems and Single Cell Measurements of a Direct Methanol Fuel Cell", Schmidt et al., *Electrochemical Society Proceedings*, vol. 95–23, pp. 267–277, 1995 (no month).
Article entitled "A vapour–feed direct–methanol fuel cell with proton–exchange membrane electrolyte", Shukla et al., *Journal of Power Sources*, vol. 55, (May 1995), pp. 87–91.

* cited by examiner

*Primary Examiner*—Patrick Ryan
*Assistant Examiner*—Jonathan Crepeau

(57) ABSTRACT

The invention relates to a DMFC in which an evaporation apparatus is connected before the cell. The fuel, which is predominantly a methanol/water mixture with a possible admixture of inert gas, is variable in its composition, whereby the respective methanol/water and, if warranted, inert gas mixture, can be adjusted in load-dependent fashion. Moreover, the invention relates to a method for operating a DMFC apparatus in which the fuel is present in the anode chamber in gaseous form.

12 Claims, 1 Drawing Sheet

DIRECT METHANOL FUEL CELL (DMFC)

BACKGROUND OF THE INVENTION

1. Field of the Invention

The invention relates to a direct methanol fuel cell (DMFC), an apparatus consisting of several DMFCs, and a method for operating DMFC apparatuses, with a high voltage efficiency and Faraday efficiency.

2. Description of the Related Art

The principle of the DMFC has been known since 1922; until now work has concentrated on the operation of the DMFC with liquid fuel. In the DMFC, methanol is taken as fuel; in earlier years alternatives to methanol were tried, such as formic acid, formaldehyde or higher-chained alcohols. The use of methanol thereby has the greatest technical significance, for which reason also the name DMFC has become accepted. The operation of the DMFC with liquid fuel takes place at relatively low temperatures, and has the disadvantage that the conversion of the methanol takes place with a relatively poor voltage efficiency, due to kinetic inhibitions of the anode reaction.

The conversion of vaporized methanol is known from J.P.-22 34 359. The water for the moistening of the membrane and for the reaction sequence is thereby supplied separately at the back side (i.e., at the cathode side). The cathode-side supplying of the water has the disadvantage that at higher current densities the electro-osmotic water transport, which is proportional to the current, works against the water diffusion through the membrane. This causes increased water consumption, because the membrane has to be kept moist with additional water. Moreover, the metered addition of water does not take place in load-dependent fashion in this prior art.

A general problem in the operation of the DMFC remains the diffusion of the fuel methanol through the electrolytes to the cathode, where it is also converted. The consequence of this, besides the loss of fuel (lowering of the Faraday efficiency), a reduction of the cell voltage (lowering of the voltage efficiency).

SUMMARY OF THE INVENTION

An object of the present invention is thus to provide a fuel cell and a fuel cell apparatus, as well as a method for operating the apparatus, in which high voltage efficiency and high Faraday efficiency are realized at high current densities. In addition, an object of the present invention is that a fuel cell, a fuel cell apparatus, and a method for operating a fuel cell are provided that operate with low electro-osmotic water loss in the cell and with the lowest possible water transport through the polymer electrolytes.

As Faraday efficiency, the degree of energy use is designated that indicates what percentage of the fuel was actually converted at the anode.

As voltage efficiency, the ratio between cell voltage under current loading and thermodynamic rest voltage is designated.

The general recognition of the invention is

First, that an increase of the Faraday efficiency is possible by minimization of the methanol diffusion inside the cell if the methanol is supplied in load-independent fashion and is consumed correspondingly in the anode chamber. It is then not present in a concentration so high that a large diffusion pressure toward the cathode arises.

Second, the invention is based on the recognition that the voltage efficiency can be improved by increasing the operating temperature, because this causes a minimization of the kinetic inhibition of the anode reaction. Moreover, the Faraday efficiency is also increased by the load-dependent supplying of the reactands at a low current density.

Third, the problem of a too-high water transport through the polymer electrodes can be reduced by the addition of an inert gas such as carbon dioxide and/or nitrogen, because by this means the water content at the anode side of the DMFC is lowered, and less water is transported to the cathode.

The subject matter of the present invention is thus a DMFC comprising a supply duct and a waste removal duct for the fuel and the oxidant respectively, a membrane electrode unit and bipolar plates, whereby an evaporating apparatus is connected before the supply duct for the fuel in such a way that, during the conversion, the fuel is present in gaseous form at the anode of the fuel cell. In addition, the subject matter of the present invention is a fuel cell apparatus that comprises a cell stack of inventive fuel cells, an evaporation apparatus and, if warranted, up to three pumps (two dosing pumps for the supply of methanol and water and one pump that brings the $CO_2$ exhaust conducted in the circuit back to the required excess pressure) in the supply line of the fuel as well as a $CO_2$ separator in the drainage line of the fuel, whereby, in the $CO_2$ separator which is connected after the fuel cell stack, the condensate of the gaseous fuel can be separated from the carbon dioxide thermally or in some other way.

In addition, the subject matter of the present invention is a method for operating a DMFC apparatus in which the fuel, consisting at least of methanol and water, is supplied to the anode in gaseous form.

The fuel of the inventive fuel cell can consist either of methanol only or of an arbitrary mixture of water and methanol. If the fuel consists of an arbitrary mixture of water and methanol, then the concentration either of methanol or water can be adjusted in load-dependent fashion via a dosing pump connected before the evaporation apparatus. The fuel can thereby be introduced into the fuel cell with variable pressure, and an arbitrary mixture of inert carrier gas, such as $CO_2$, $N_2$, argon, etc., can be mixed with it.

A preferred embodiment of the fuel cell provides that an inert gas, such as e.g. carbon dioxide and/or nitrogen or the like, can be mixed with the methanol/water mixture. By this means, the water content is reduced at the anode side of the DMFC, and less water is transported through the polymer electrodes to the cathode side.

The degree of moistness $x_f = V_{nW}/V_n$, where $V_{nW}$=water vapor volume under normal conditions; $V_n$=total volume under normal conditions, can be adjusted arbitrarily by means of the inert gas. Degrees of moistness greater than 70%, preferably between 80 and 90%, prove useful, because then the polymer membrane is not yet dried out. The degree of moistness will be as high as possible so that the energy expenditure for the gas transport remains as low as possible. The degree of moistness also depends on the operating temperature of the DMFC. The higher this is, the higher the degree of moistness must also be, since the water content in the membrane decreases rapidly at temperatures above 100° C. The degree of moistness $x_f$ (in relation to the volume) is defined as follows:

$$x_f = V_{nW}/V_n = V_{nW}/(V_{nW}+V_{nL}) = p_W/p$$

$V_{nL}$=dry gas volume under normal conditions, i.e. the volume of gaseous methanol, with or without inert gas additive;

$p_W$=water vapor partial pressure
$p$=total pressure

The inventive fuel cell apparatus preferably consists of a cell stack of inventive fuel cells, but it can also be constructed of various types of fuel cells in combination. The evaporation apparatus and, if warranted, one or two dosing pumps that supply the fuel or the water in load-dependent fashion are thereby integrated into the supply line of the fuel to the cell stack.

In an anode circuit, in the $CO_2$ separator the $CO_2$ that has arisen is separated from the exhaust gas, which is rich in unconsumed methanol. The exhaust gas is then present in condensed form and can be supplied in the circuit, i.e. can be introduced into the evaporation apparatus. In addition, a part of the separated carbon dioxide can likewise be conducted in the circuit via an excess pressure pump that also regulates the amount of added inert gas.

Anode circuit means that the fuel, methanol or methanol/water mixture, respectively with or without inert gas additive, is conducted past the anode in a circular closed system, whereby additional fuel is supplied to the system as needed, and gaseous reaction product is separated out from the system.

The unconsumed fuel contained in the fuel exhaust gas is first condensed or cooled using heat, and is then introduced again into the supply line or into the evaporation apparatus. The load-dependent controlling of the dosing pumps that regulate the inflow of water/methanol into the evaporation apparatus must thereby be constructed in such a way that the changes in concentration of the methanol/water mixture in the evaporation apparatus due to the supplying from the exhaust gas are taken into account.

The unconsumed fuel from the fuel exhaust gas is separated from the contained carbon dioxide physically, or in some circumstances, also chemically in the heat exchanger or $CO_2$ separator. Physical separation thereby means that the separation takes place via the various physical characteristics of the substances (such as density, boiling point, etc.). Chemical separation is also conceivable, including means that the $CO_2$ is chemically bound and precipitated e.g. as carbonate (not very useful energetically, due to the high mass of the resulting carbonate, but alternative chemical methods can be discussed).

As DMFC the direct methanol fuel cell is designated that consists of an anode, a cathode and a suitable electrolyte, in analogy to the general principle of electrochemical energy converters. In general, the electrodes are contacted at the back side, i.e. with the side facing away from the electrolyte, through a current collector which has in addition the task of gas distribution or, respectively, reactand distribution. As a result of the type of electrolytes used, there result various possibilities for the realization of a DMFC. In the context of the present invention, preferred acid electrolytes, and thereby in particular acid solid electrolytes, are treated. In general, proton-conducting polymers (electrolyte membranes), which are stable under the corresponding operating conditions, are thereby suitable. As an example, NAFION (registered trademark) is hereby mentioned as a suitable polymer. As a further electrolyte apart from those mentioned, those based on inorganic systems are hereby also mentioned, such as tin phosphates or electrolytes based on siloxane frameworks.

As current collectors, materials based on carbon, e.g. carbon fiber paper or tissue, are standardly used. As catalysts, at the anode side platinum/ruthenium alloys are used with first priority; at the cathode side pure platinum is mostly used. In the realization of a fuel cell apparatus, such as e.g. a battery, in order to achieve higher voltages the individual cells are connected in series in bipolar fashion. The bipolar plates required therefor can be made of graphite, metallic or other electrically conductive and corrosion-resistant materials. The bipolar plates simultaneously take over the task of reactand supplying. They are thus structured with corresponding ducts, if necessary.

According to the boiling point of the mixture, the operation of the DMFC can take place at temperatures between 60 and 160° C. The operating temperature will preferably fall into a range from 100 to 150° C.; typically it is between 120 and 130° C. Correspondingly, methanol or also corresponding methanol/water mixtures are heated above the boiling point and supplied to the cell in gaseous form. The system pressure is thereby adjusted so that it corresponds to the equilibrium pressure of the methanol/water mixture at the temperature of the fuel cells. In the anode chamber of the DMFC, the vapor is thus in a saturated state. By means of this vaporized supplying of the reactants, the electro-osmotic water transport is minimized, because the quantity of water at the anode is greatly reduced. In the context of the present application, the terms "fuel," "methanol" and "mixture of water and methanol" always designate a vaporized fuel that contains an indeterminate quantity of inert gas (i.e., from 0% up to a degree of moistness of almost 100). In the case of $CO_2$ as an inert gas, it can be a part of the anode exhaust gas that is again brought to the required excess pressure via a pump and a corresponding control valve (see also FIG. 2) and is conducted in the circuit.

As stated, a methanol/water mixture or pure ethanol, with or without inert gas additive, is used as fuel; however, the invention is not to be limited thereto, if the electrochemical oxidability of other water-soluble organic molecules turns out to be technically profitable. As stated, the fuel is conducted in the circuit via a carbon dioxide separator connected to the exhaust gas line of the fuel cell, which has at the same time the function of separating the resulting carbon dioxide from the rest of the exhaust gas.

As an oxidant, either pure oxygen or air or arbitrary mixtures of these components are designated, whereby the oxidant of the cathode is preferably supplied in a quantity leaner than stoichiometric.

A particular problem of the DMFC is the search for suitable anode materials for the oxidation of the fuel. Thus, besides the named platinum/ruthenium alloys, according to the state of research, various anode materials and catalysts can be used on the anode according to the invention. For example, it is hereby mentioned that under some circumstances it is possible to bring about a slight additional improvement of the activity of the anode in relation to the binary system platinum/ruthenium by adding a third component, such as tin or nickel, to the alloy. The invention is not to be limited to noble metals as catalysts and anode materials or, respectively, cathode materials; rather, catalysts free of noble metals are also conceivable.

The concentration of methanol in the fuel cell mixture in relation to the unvaporized liquid state can be between 0.05 and 5 mol/l. A concentration between 0.5 and 1.5 mol/l is thereby particularly preferred.

As a further operating parameter the pressure is hereby mentioned, which can be between normal pressure and a slight excess pressure and partial vacuum. The above definitions hold for the specification, the explanations of the Figures and the claims.

Other objects and advantages of the present invention will become apparent from reading the following detailed description and appended claims, and upon reference to the accompanying drawings.

BRIEF DESCRIPTION OF THE DRAWINGS

In the following, the invention is explained in more detail on the basis of two Figures.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
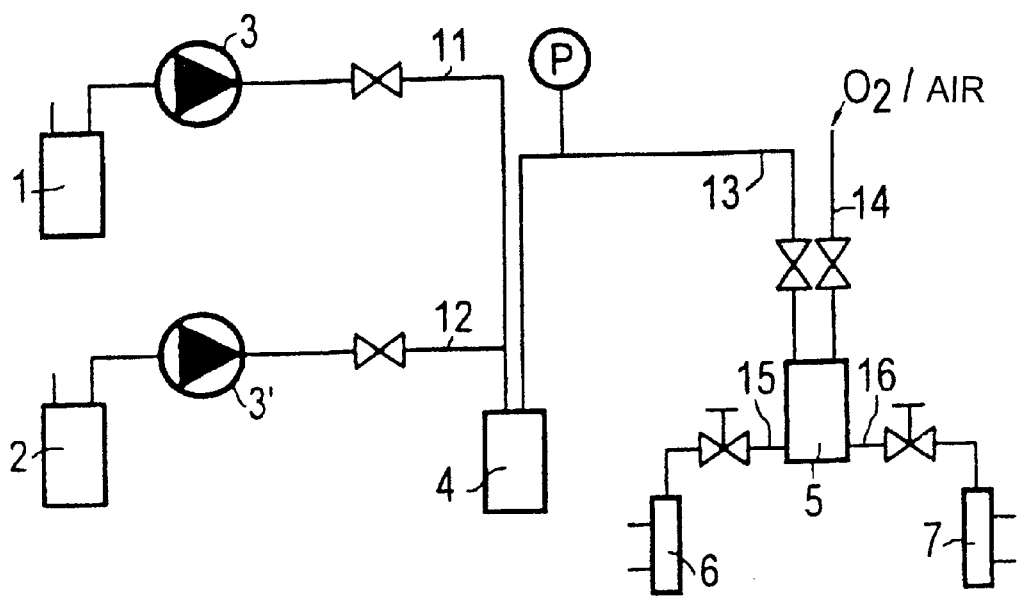
FIG. 1 shows a block switching diagram of an inventive fuel cell apparatus.

FIG. 1 shows a fuel cell apparatus that can be operated both with a methanol/water mixture and also with pure methanol as fuel. The apparatus has dosing pumps 3 and 3', which regulate the supply of methanol or/and water in load-dependent fashion via a control system. From left to right, FIG. 1 shows, first, the two containers 1 and 2 in which water and methanol are contained. From these supply containers 1 and 2, the components of the liquid fuel, i.e. water and methanol, flow into the dosing pumps 3 and 3', which respectively regulate the flow speed of the liquids. In the case of the supply container 1, which is for example the water container, the quantity of water metered in load-dependent fashion in the dosing pump 3 flows into the evaporation apparatus 4 via the line 11. Likewise, a particular quantity of methanol flows from the supply container 2 via the dosing pump 3' and the line 12 into the same evaporation apparatus 4. In the evaporation apparatus 4, both liquids are heated over the boiling point, and via the line 13 the vapor mixture that results in the evaporation apparatus is introduced into the fuel cell stack 5. There it is conducted into the respective anode chambers of the individual fuel cells via a supply duct. Via the line 15, the consumed fuel exhaust, enriched with $CO_2$, again leaves the fuel cell stack and flows into the carbon dioxide separator or heat exchanger 6, in which it is again condensed out if necessary, using the heat energy. The resulting $CO_2$ can there be separated from the exhaust gas/condensate. Via the line 14, parallel to the line 13, the fuel cell is supplied with oxidant at the cathode side. The oxidant exhaust gas leaves the cell stack again via the line 16 and is conducted into the heat exchanger 7.

Figure 2:
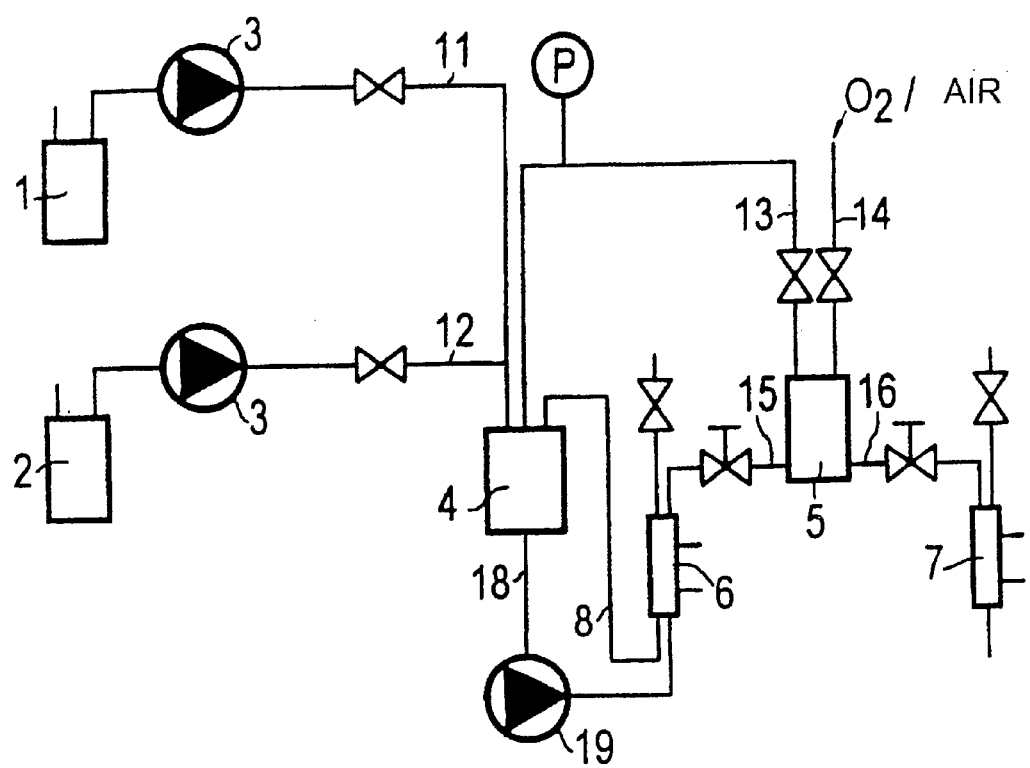
FIG. 2 likewise shows a block switching diagram of an inventive fuel cell apparatus, in which, however, the fuel cell is conducted in the circuit via a $CO_2$ separator connected to the fuel cell.

FIG. 2 shows a similar block switching diagram of an inventive fuel cell apparatus, with the difference that the heat exchanger or carbon dioxide separator 6, connected to the fuel exhaust gas line from the fuel cell stack, is connected with the evaporation apparatus 4 via the line 8. Via the line 8, the fuel exhaust gas, condensed out or cooled in the heat exchanger or carbon dioxide separator 6 if warranted, now again flows into the evaporation apparatus 4, where it is again supplied to the fuel cell via the line 13. Via a second line 18, the deposited $CO_2$ is likewise conducted from the heat exchanger 6 into the evaporation apparatus 4. In the line 18 there is a pump 19 through which the $CO_2$ is again brought to the required excess pressure.

As stated, the composition of the fuel mixture is oriented according to the respective load of the fuel cell stack and the predetermination of the degree of moisture. Via a regulating mechanism that compares the predetermined water/methanol concentrations, given in terms of the load, as a target value with the actual value of the mixture given in the line 13, the performance of the dosing pumps 3 and 3' is adjusted. The addition of inert gas is likewise controlled via a regulating mechanism that compares the degree of moisture in the line 13, as an actual value, with a predetermined degree of moisture as a target value. The inert gas may be added by way of a line 21 directly to the evaporator 4 (FIG. 1) or to the pump 19 which precedes the evaporator 4 (FIG. 2). A pump 22 (FIG. 1) may also be included in the inert gas supply line 21. This embodiment of the invention thus enables an optimization of the Faraday efficiency.

A fuel cell, in particular a battery consisting of the inventive fuel cells, works with a voltage efficiency and Faraday efficiency that is essentially increased in relation to the prior art. In addition, by means of the vaporized presence of the reactants the "flooding" of the cathode is prevented, or at least is largely forced back. In this case, "flooded" means that methanol and water flow into the working layer of the cathode and the hydrophocity of the gas transport pores decreases, so that they are full of reaction water, thus hindering the transport of oxygen and causing the cell voltages to collapse.

The increasing of the Faraday efficiency is thereby achieved mainly by means of the minimization of the methanol diffusion through the membrane. Via the dosing pump 3, controlled in load-dependent fashion, only as much methanol is respectively evaporated in the evaporation apparatus 4 as is required in the current operating state of fuel cell stacks. "Fuel requirement" is thereby defined as a load-dependent target value that by means of the Faraday equivalents of the reaction and an operationally caused bandwidth, which bandwidth is preferably present in an excess. The methanol concentration is thus variably adjustable at the anode, following the change of load, and extreme operating parameters (such as standby and full load) can also be adjusted in a state that is optimally close to the limiting diffusion current (i.e., still with maximum performance but close to the limiting diffusion current along the characteristic line in the voltage/current diagram). The modification of the methanol concentration in the gas mixture must not be regulated via the water supply or the pressure; rather, it can of course also be controlled via the addition of an inert carrier gas.

For the adjustment of the dosing pumps, no extra measurement of the actual value of the concentration of methanol or fuel prevailing in the cell need take place, because the dosing pump can be adjusted in load-dependent fashion, and the consumption of methanol, and thereby also the quantity still contained in the recycled exhaust gas, can be calculated via the current curve.

An additional monitoring determination of the actual value of the methanol concentration in the gaseous fuel mixture can however also for example take place in the supply line 13 from the evaporation apparatus to the fuel stack, or in the evaporation apparatus itself. If the determination of the actual value takes place in the evaporation apparatus, the container of the evaporation apparatus must be selected with respect to its dimension in such a way that a complete evaporation is ensured in all conceivable operational states, and thus no change in concentration due to condensation results. As a rule, however, a monitoring determination of the water-methanol mixture ratio will take place, if at all, as far as possible in the direct supply line to the supply duct of the fuel cell stack.

According to the invention, a simpler construction of the cell is realized in that the water is supplied at the anode side and not, as in the cited prior art, at the cathode side.

A battery consisting of inventive fuel cells is, among other things, conceivable for use in mobile energy supply, such as for example in an automobile. However, it is also conceivable in larger stationary energy supply installations, such as for example in power stations or for the supply of electrical power and heat to residential buildings or office buildings.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A direct methanol fuel cell system comprising:
   a water supply line connected to an evaporation apparatus, the water supply line comprising a first dosing pump for regulating a flow of water to the evaporation apparatus,
   a methanol supply line connected to the evaporation apparatus, the methanol supply line comprising a second dosing pump for regulating a flow of methanol to the evaporation apparatus,
   the evaporation apparatus being connected to a fuel cell stack by a supply duct, the fuel cell stack being connected to a fuel waste removal duct and an oxidant waste removal duct, the fuel cell stack further comprising a plurality of fuel cells each comprising, a membrane-electrode unit and bipolar plates,
   the fuel waste removal duct being connected to a separator for separating gaseous carbon dioxide from fuel waste, the separator being connected to the evaporation apparatus by a supply line for transmitting carbon dioxide from the separator to the evaporation apparatus,
   the evaporation apparatus vaporizing water and methanol and supplying gaseous water, methanol and carbon dioxide to the fuel cell stack through the supply duct,
   whereby the concentrations of methanol, water and/or carbon dioxide in the supply duct can be adjusted in load-dependent fashion adjusting the dosing pumps.

2. The direct methanol fuel cell system of claim 1 wherein a degree of moistness at the membrane-electrode unit is greater than 70%.

3. The direct methanol fuel cell system claim 1 wherein the separator separates unconsumed fuel from the reaction product carbon dioxide.

4. The direct methanol fuel cell system of claim 1 wherein the separator further comprises a heat exchanger.

5. A direct methanol fuel cell system comprising:
   a water supply line connected to an evaporation apparatus, the water supply line comprising a first adjustable valve for regulating a flow of water to the evaporation apparatus,
   a methanol supply line connected to the evaporation apparatus, the methanol supply line comprising a second adjustable valve for regulating a flow of methanol to the evaporation apparatus,
   the evaporation apparatus being connected to a fuel cell stack by a supply duct, the fuel cell stack being connected to a fuel waste removal duct and an oxidant waste removal duct, the fuel cell stack further comprising a plurality of fuel cells each comprising, a membrane-electrode unit and bipolar plates,
   the fuel waste removal duct being connected to a separator for separating gaseous carbon dioxide from fuel waste, the fuel waste removal duct comprising a third adjustable valve for regulating a flow of carbon dioxide and fuel waste to the separator, the separator being connected to the evaporation apparatus by a supply line for transmitting carbon dioxide from the separator to the evaporation apparatus,
   the evaporation apparatus vaporizing water and methanol and supplying gaseous water, methanol and carbon dioxide to the fuel cell stack through the supply duct,
   whereby the concentrations of methanol, water and/or carbon dioxide in the supply duct can be adjusted by adjusting the first, second and third adjustable valves.

6. The direct methanol fuel cell system of claim 5 wherein a degree of moistness at the membrane-electrode unit is greater than 70%.

7. The direct methanol fuel cell system of claim 5 wherein the separator separates unconsumed fuel from the reaction product carbon dioxide.

8. The direct methanol fuel cell system of claim 5 wherein the separator further comprises a heat exchanger.

9. A method for the operation of a direct methanol fuel cell apparatus including a fuel cell connected to a supply duct, the fuel cell also being connected to a fuel waste removal duct, the fuel cell further comprising a membrane electrode unit and bipolar plates, the method comprising:
   controlling amounts of gaseous methanol, water and/or an inert gas supplied to the fuel cell through the supply duct in a load-dependent fashion,
   separating carbon dioxide from a waste fuel flowing through the fuel waste removal duct, and
   combining at least a portion of the carbon dioxide with the methanol, water and inert gas being supplied to the fuel cell through the supply duct.

10. A direct methanol fuel cell system comprising:
    a water supply line connected to an evaporation apparatus, the water supply line having a first dosing pump for regulating a flow of water to the evaporation apparatus,
    a methanol supply line connected to the evaporation apparatus, the methanol supply line having a second dosing pump for regulating a flow of methanol to the evaporation apparatus,
    an inert gas supply line connected to the evaporation apparatus, said inert gas supply line having a third dosing pump for regulating a flow of inert gas to the evaporation apparatus,
    the evaporation apparatus being connected to a fuel cell stack by a supply duct,
    the fuel cell stack being connected to a fuel waste removal duct and an oxidant waste removal duct, the fuel cell stack further comprising a plurality of fuel cells each comprising a membrane-electrode unit and bipolar plates, and
    a separator for separating gaseous carbon dioxide from fuel waste being connected to the fuel waste removal duct and having an outlet connected to the third dosing pump for transmitting carbon dioxide from the separator to the evaporation apparatus to be combined with the water and methanol,
    the evaporation apparatus vaporizing water and methanol and supplying gaseous water, methanol and inert gas to the fuel cell stack through the supply duct, whereby concentrations of methanol, water and/or inert gas in the supply duct can be adjusted by adjusting the first, second and third dosing pumps.

11. The direct methanol fuel cell system of claim 10, wherein the separator separates unconsumed fuel from the reaction product carbon dioxide and has a line extending to the evaporation apparatus to supply the unconsumed fuel to the evaporation apparatus.

12. The direct methanol fuel cell system of claim 10, wherein the separator comprises a heat exchanger.

* * * * *